United States Patent
Kogusuri

(10) Patent No.: US 8,275,244 B2
(45) Date of Patent: Sep. 25, 2012

(54) RECORDING APPARATUS

(75) Inventor: Koji Kogusuri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 827 days.

(21) Appl. No.: 12/333,152

(22) Filed: Dec. 11, 2008

(65) Prior Publication Data

US 2009/0162030 A1    Jun. 25, 2009

(30) Foreign Application Priority Data

Dec. 21, 2007 (JP) ................................ 2007-330825

(51) Int. Cl.
*H04N 9/80* (2006.01)
*H04N 5/89* (2006.01)
*H04N 5/92* (2006.01)
*G11B 7/00* (2006.01)

(52) U.S. Cl. ........ 386/241; 386/248; 386/334; 386/337; 369/124.09

(58) Field of Classification Search .................. 386/241, 386/248, 334, 337, E5.042; 369/124.09
See application file for complete search history.

(56) References Cited

U.S. PATENT DOCUMENTS

2009/0238539 A1   9/2009 Isobe et al.
2009/0317067 A1* 12/2009 Isobe et al. .................... 386/126

FOREIGN PATENT DOCUMENTS

CN   101351845 A   1/2009
JP   2005-260440 A   9/2005

OTHER PUBLICATIONS

Office Action for corresponding CN application dated Apr. 13, 2010.

* cited by examiner

*Primary Examiner* — Thai Tran
*Assistant Examiner* — Syed Hasan
(74) *Attorney, Agent, or Firm* — Canon U.S.A., Inc. IP Division

(57) ABSTRACT

A recording apparatus includes an input unit to which moving picture data is input, a memory, a management-information processing unit configured to generate management information related to a position of a predetermined picture in the moving picture data and to store the information in the memory, a recording unit configured to create a moving picture file and a clip information file on a recording medium, to record the moving picture data on the medium by storing the data in the moving picture file, and to record the management information on the medium by storing the information in the clip information file, and a control unit configured to control the recording unit so that, when a size of the stored information reaches a predetermined size during recording of the moving picture file, the recording unit stops recording and records the data by storing the data in a new moving picture file.

36 Claims, 6 Drawing Sheets

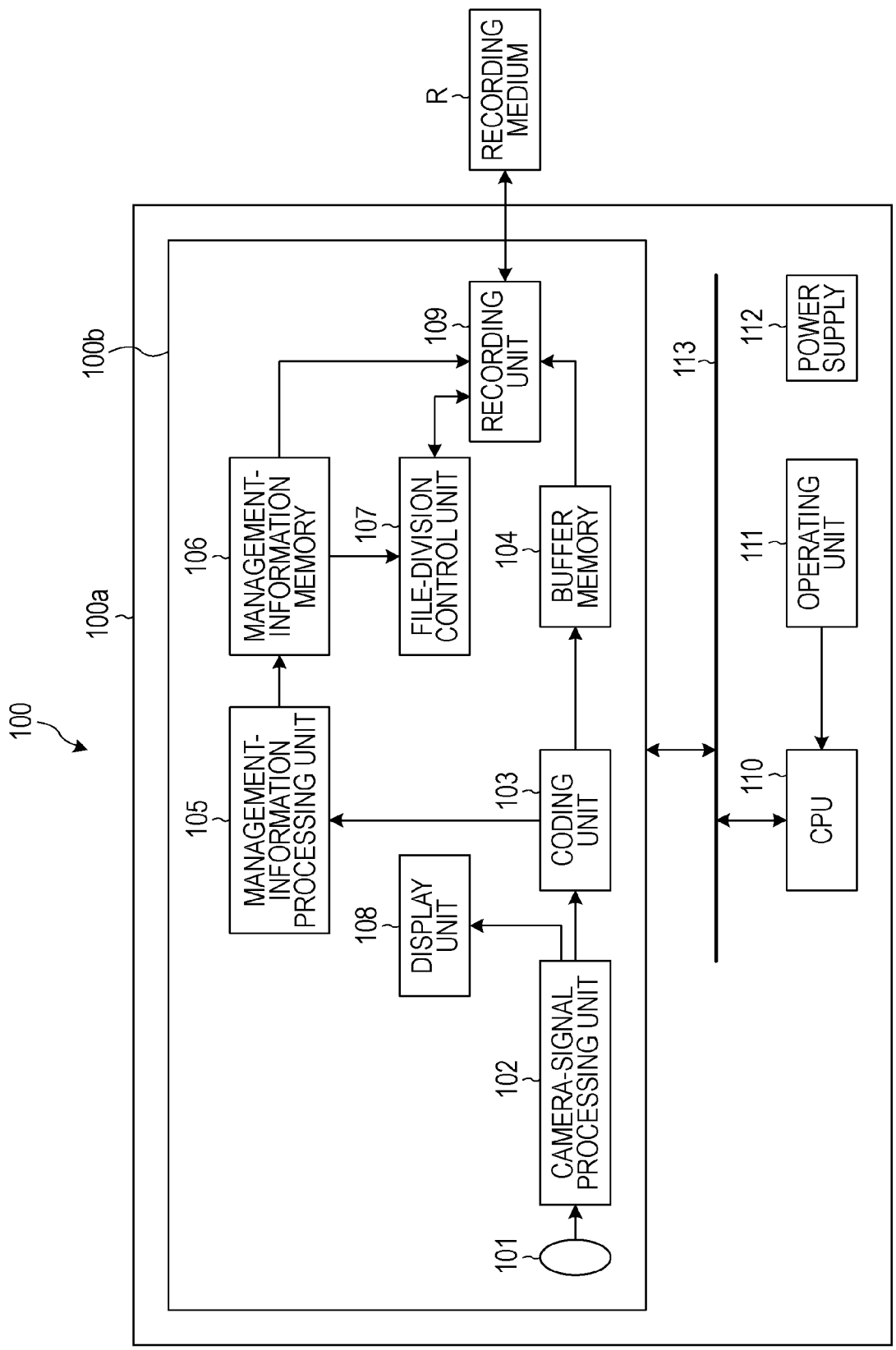

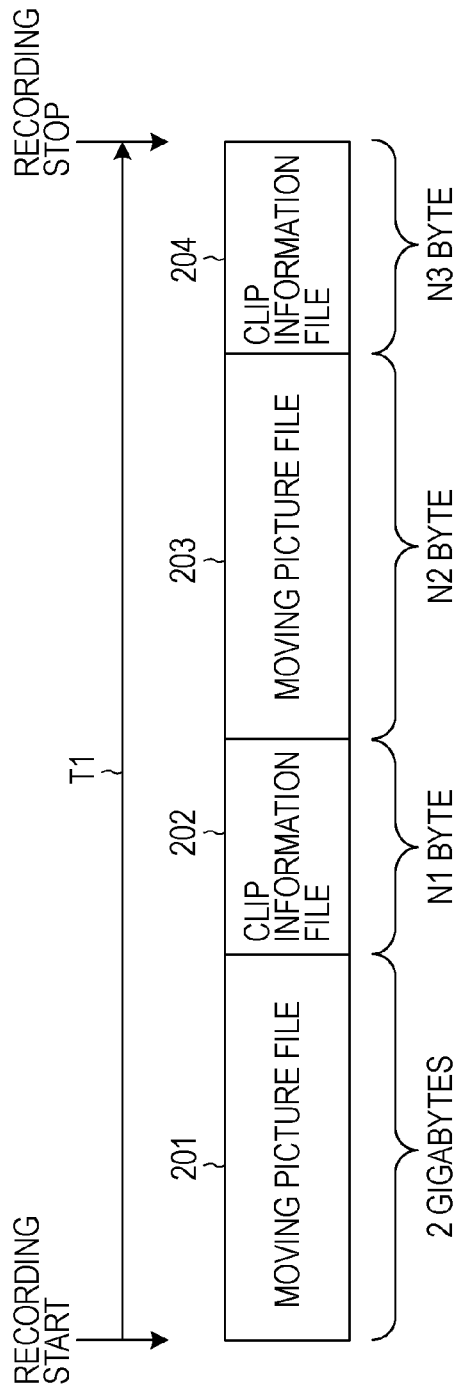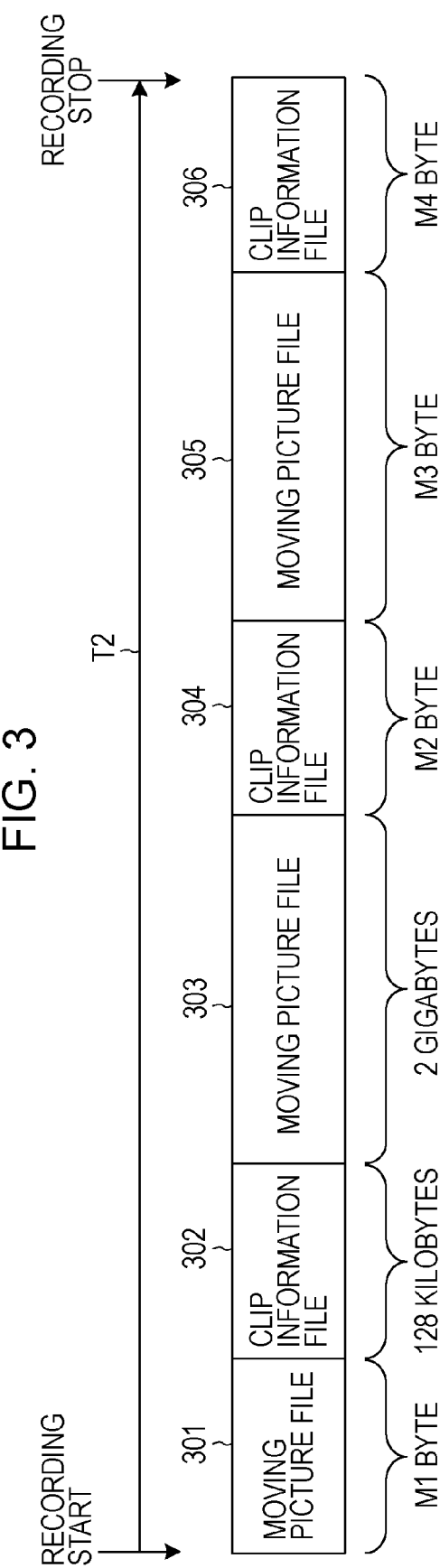

FIG. 7

| GOP NO. | OFFSET (BYTE) |
|---|---|
| GOP 1 | 0 |
| GOP 2 | n1 |
| GOP 3 | n2 |
| ⋮ | ⋮ |

RECORDING APPARATUS

BACKGROUND OF THE INVENTION

1. Field of the Invention

The present invention relates to a recording apparatus. More particularly, the present invention provides an apparatus that can record a long moving picture without using a large-capacity memory in order to accumulate management information.

2. Description of the Related Art

Recording apparatuses which record moving picture data on random access media, such as magnetic disks and memory cards, are known. In these apparatuses, moving picture data is treated as moving picture files, and the moving picture files are written in and read from the recording media under management by a predetermined file system.

A file system refers to a structure type used to create files and folders in recording media or to manage deletion and movement of the files and the folders. A file-name addition method and a file size are specified in each file system. As such file systems, an FAT (File Allocation Table) and a UDF (Universal Disc Format) are known.

For example, in a recording apparatus adopting a FAT, when the size of a moving picture file that is now being recorded reaches the maximum size specified by the FAT, the file is divided. In other words, recording of the moving picture file is stopped before completion, e.g., halfway, and a new file is created so as to continue recording of moving picture data.

Japanese Patent Laid-Open No. 2005-260440 proposes that a moving picture file is divided and recorded every time a predetermined time elapses after recording of moving picture data starts.

Further, an AVCHD (Advanced Video Codec High Definition) method has recently been proposed as a standard of consumer recording apparatuses that record high-definition (HD) moving pictures having more pixels in one picture than known standard pictures (VGA size).

In an AVCHD method, moving picture data is coded according to an MPEG-4 AVC/H.264 format, and is recorded as a moving picture file on a recording medium. In addition to the moving picture file, a clip information file including management information about the moving picture file is created and recorded. This clip information file contains information about the position of a specific picture (the first intra-frame in each GOP (Group of Pictures)) in moving picture data. The clip information file is used to play back the moving picture data at a fast speed and to access a designated position.

Since the position of an intra-frame in moving picture data can be known only after the completion of recording, management information is usually held in an internal memory of the apparatus during recording of the moving picture data. After recording of the moving picture data is completed, all management information held in the memory is recorded as a clip information file.

In such a recording apparatus, if power is unpredictably shut down during recording, a clip information file is not recorded. Thus, it is difficult to play back recorded moving picture data.

It is conceivable to divide and record a moving picture file at regular time intervals and to record a clip information file every time a moving picture file is divided and recorded, as disclosed in Japanese Patent Laid-Open No. 2005-260440.

In this case, however, a clip information file about a moving picture file that is being recorded at power shutdown is also not recorded. Therefore, it is difficult to play back the moving picture file.

Accordingly, management information can be accumulated in a nonvolatile memory and be stored when power is shut down. In this case, the management information can be read out from the memory when power is restored, and can be recorded as a clip information file.

Unfortunately, since the size of management information is proportional to the length of recording time of the corresponding moving picture, when a long moving picture is recorded, a large-capacity memory is necessary to accumulate management information about the picture.

Therefore, when management information is held in the nonvolatile memory, as described above, it is necessary to prepare a large-capacity memory so as to hold management information corresponding to a long moving picture. This increases the cost of the recording apparatus.

SUMMARY OF THE INVENTION

The present invention provides an apparatus that can record a long moving picture without using a large-capacity memory in order to accumulate management information.

According to an aspect of the present invention, a recording apparatus includes an input unit, a memory, a management-information processing unit, a recording unit and a control unit. Moving picture data is input into the input unit. The management-information processing unit is configured to generate management information related to a position of a predetermined picture in the moving picture data and to store the management information in the memory. The recording unit is configured to create a moving picture file and a clip information file on a recording medium, to record the moving picture data on the recording medium by storing the moving picture data in the moving picture file, and to record the management information on the recording medium by storing the management information in the clip information file. The control unit is configured to control the recording unit so that, when a size of the management information stored in the memory reaches a predetermined size corresponding to a capacity of the memory during recording of the moving picture file, the recording unit stops recording of the moving picture file, creates a new moving picture file, and records the moving picture data by storing the moving picture data in the new moving picture file.

According to another aspect of the present invention, a recording apparatus includes an input unit, an operating unit, a memory, a management-information processing unit, a recording unit and a control unit. The moving picture data is input to the input unit. The operating unit is configured to give instructions to start and stop recording of the moving picture data. The management-information processing unit is configured to generate management information related to a position of a predetermined picture in the moving picture data according to the instructions to start recording and to store the management information in the memory. The recording unit is configured to record the moving picture data on a recording medium according to the instructions to start recording, the recording unit creating a moving picture file and a clip information file on the recording medium, recording the moving picture data on the recording medium by storing the moving picture data in the moving picture file, and recording the management information on the recording medium by storing the management information in the clip information file. The control unit is configured to control the recording unit so that, when a size of the management information stored in the memory reaches a predetermined size corresponding to a capacity of the memory after the instructions to start recording are given, the recording unit stops recording of the moving picture file, creates a new moving picture file, and records the moving picture data by storing the moving picture data in the new moving picture file.

According to another aspect of the present invention, a recording apparatus includes an input unit, a memory, a management-information processing unit, a recording unit and a control unit. Moving picture data is input to the input unit. The management-information processing unit is configured to generate management information related to a position of a predetermined picture in the moving picture data and to store the management information in the memory; The recording unit is configured to create a moving picture file and a clip information file on a recording medium according to a predetermined file system, to record the moving picture data on the recording medium by storing the moving picture data in the moving picture file, and to record the management information on the recording medium by storing the management information in the clip information file. The control unit is configured to control the recording unit so that, when a size of the management information reaches a predetermined size during recording of the moving picture file or when a size of the moving picture file that is being recorded reaches an upper limit size specified by the file system, the recording unit stops recording of the moving picture file, creates a new moving picture file, and records the moving picture data by storing the moving picture data in the new moving picture file.

Further features of the present invention will become apparent from the following description of exemplary embodiments with reference to the attached drawings.

BRIEF DESCRIPTION OF THE DRAWINGS

FIG. 1 is a block diagram showing a configuration of a recording apparatus according to an embodiment of the present invention.

FIG. 2 shows data recorded on a recording medium.

FIG. 3 shows data recorded on a recording medium.

FIG. 7 shows a clip information file.

DESCRIPTION OF THE EMBODIMENTS

Figure 4:
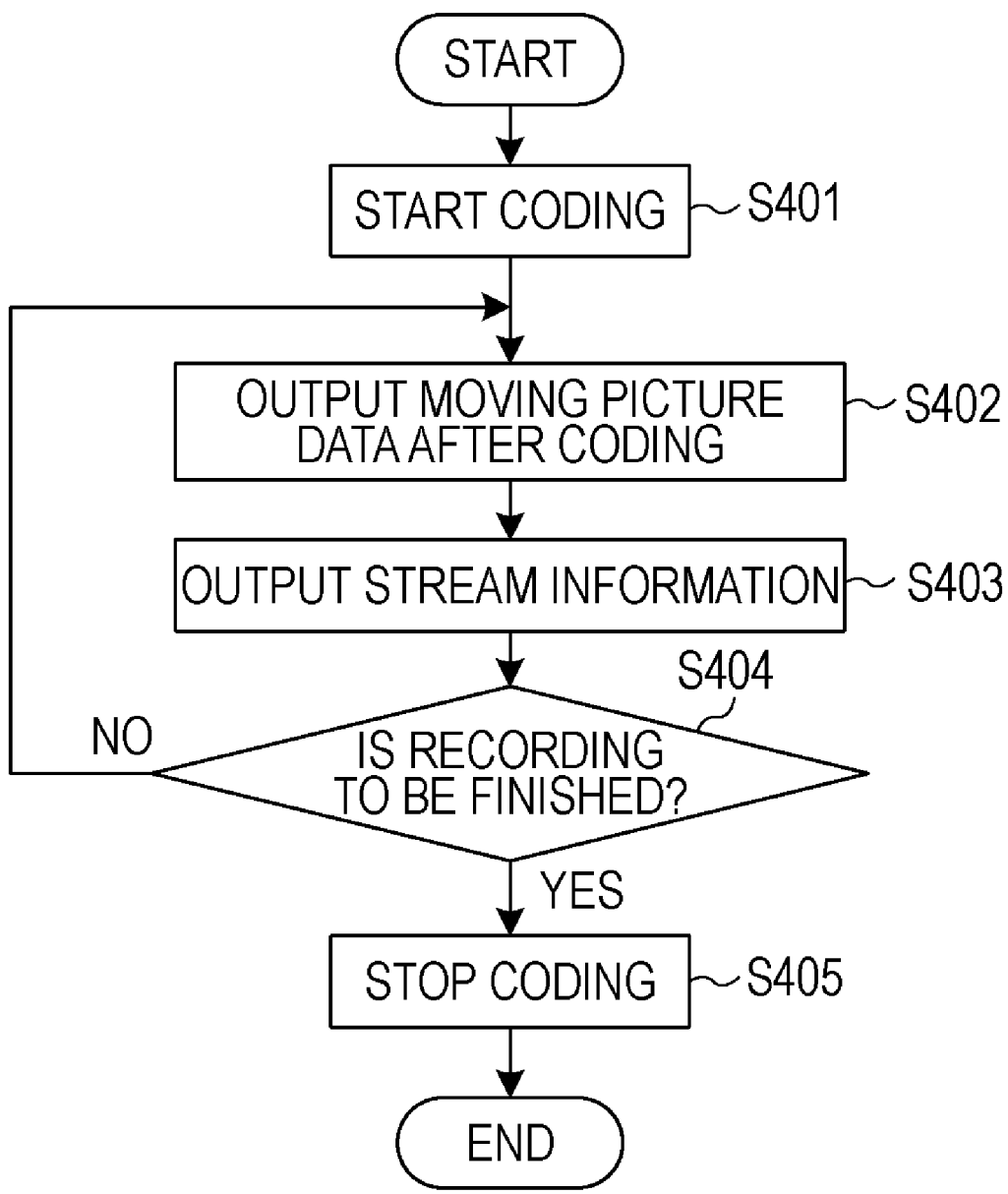
FIG. 4 is a flowchart showing a coding procedure.

FIG. 1 is a block diagram showing a configuration of a recording apparatus 100 according to an embodiment of the present invention. Referring to FIG. 1, the recording apparatus 100 includes a main body 100a. The main body 100a includes a signal processing unit 101b, a central processing unit (CPU) 110, an operating unit 111 and a power supply 112. The signal processing unit and the CPU 110 communicate via a bus 113.

The signal processing unit 100b includes a lens unit 101, a camera-signal processing unit 102, a coding unit 103, a buffer memory 104, a management-information processing unit 105, a management-information memory 106, a file-division control unit 107, a display unit 108 and a recording unit 109.

The lens unit 101 includes an image pickup element such as a CCD. The camera-signal processing unit 102 converts object light output from the lens unit 101 into moving picture data, and outputs the moving picture data to the coding unit 103 and the display unit 108 after performing predetermined processing. The coding unit 103 codes the moving picture data output from the camera-signal processing unit 102 according to an MPEG-4 AVC/H.264 format.

The buffer memory 104 temporarily stores the moving picture data output from the coding unit 103. The management-information processing unit 105 creates management information based on stream information about the amount of moving picture data that is output from the coding unit 103. The management-information memory 106 accumulates management information created by the management-information processing unit 105. The file-division control unit 107 determines whether to divide a moving picture file that is now being recorded, and controls the recording unit 109 based on the determination result. The display unit 108 displays pictures related to the moving picture data from the camera-signal processing unit 102. The display unit 108 is controlled by the CPU 110, and displays necessary information such as a menu screen.

The recording unit 109 reads out data from the buffer memory 104 and the management-information memory 106, and records the data at an address designated on a recording medium R according to a predetermined file system.

The CPU 110 controls the operation of the recording apparatus 100, and controls the elements of the signal processing unit 100b via the bus 113. The operating unit 111 includes a power switch, a trigger switch for ordering start and stop of recording, a setting switch for setting a recording mode of moving picture, etc. The power supply 112 supplies power to the elements shown in FIG. 1. The power supply 112 includes a removable battery.

The recording medium R is formed, for example, by an optical disk or a memory card, and can be easily loaded in and unloaded from the recording apparatus 100 with a loading and unloading mechanism. The recording medium R may be incorporated in the main body 100a of the recording apparatus 100.

When instructions to start recording are given from the operating unit 111, moving picture data output from the lens unit 101 and the camera-signal processing unit 102 is coded by the coding unit 103, and is accumulated in the buffer memory 104. The recording unit 109 creates a moving picture file, sequentially reads out the moving picture data temporarily stored in the buffer memory 104 and stores and records the moving picture data in the moving picture file. In parallel with recording in the moving picture file, the management-information processing unit 105 acquires stream information from the coding unit 103, and creates management information. The management-information processing unit 105 sequentially accumulates created management information in the management-information memory 106.

When instructions to stop recording are given from the operating unit 111, the coding unit 103 stops coding, the moving picture data accumulated in the buffer memory 104 is recorded on the recording medium R, and recording in the moving picture file is stopped. After that, the recording unit 109 reads out management information accumulated in the management-information memory 106, records the management information as a clip information file on the recording medium R, and stops recording. In this embodiment, the recording unit 109 manages recording of data on the recording medium R according to a FAT.

A clip information file will now be described. As described above, a clip information file includes information about, for example, the position of a specific picture in moving picture data stored in a moving picture file (e.g., the first intra-frame in each GOP).

In an MPEG-4 AVC format, intra-frame coding, forward predictive coding, bidirectional predictive coding, and intra-frame predictive coding are prepared. In this embodiment, intra-frame coding and intra-frame predictive coding are generically referred to as intra-coding. A series of moving picture data are coded in each GOP including a predetermined number of frames. In this case, an intra-coded frame (intra-frame) is placed at the head of each GOP.

Every time coding of one GOP is completed, the coding unit 103 outputs information about the coding amount (data amount) of the GOP to the management-information processing unit 105. Since the MPEG-4 AVEC format is a variable length coding format, the coding amount varies on a frame to frame basis.

Then, the management-information processing unit 105 detects the offset (data amount) from the head of the moving picture file in each of first intra-frames of the GOPs, and accumulates the offset as management information in the management-information memory 106.

The recording unit 109 reads out the management information from the management-information memory 106 at an appropriate timing, and stores the management information in a clip information file so as to be recorded on the recording medium R. By using the clip information file during playback, the position of a frame designated in the moving picture data can be calculated, and instant access to the frame and fast playback can be realized.

Figure 7:
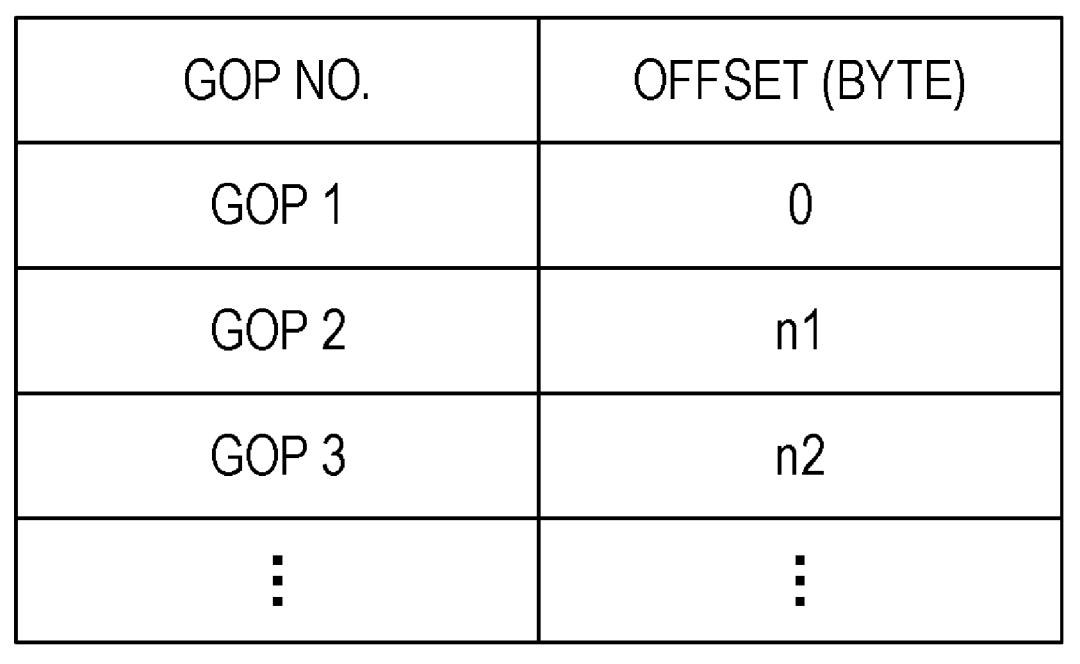

FIG. 7 shows an exemplary clip information file. As shown in FIG. 7, clip information includes the offset values from the beginnings of GOPs in moving picture data stored in the corresponding moving picture file.

FIG. 2 shows moving picture files and clip information files recorded on the recording medium R. In FIG. 2, recording of a moving picture is stopped a time T1 after instructions to start recording are given.

The size of the first moving picture file 201 reaches an upper limit, e.g., 2 gigabytes (GB) serving as the upper limit specified by the FAT during recording. Thus, at the time when the size of the moving picture file 201 that is now being recorded reaches 2 GB, recording of the moving picture file 201 is stopped, and a new moving picture file 203 is created so as to continue recording. After recording of the moving picture file 201 is stopped, a clip information file 202 related to the moving picture file 201 is recorded on the recording medium R. In this case, the size of the clip information file 202 is N1 bytes corresponding to the recording time of moving picture data stored in the moving picture file 201.

When instructions to stop recording are given during recording of the moving picture file 203, recording is stopped, and a clip information file 204 related to the moving picture file 203 is recorded on the recording medium R. The size of the clip information file 204 is N3 bytes corresponding to the recording time of moving picture data stored in the moving picture file 203 which is N2 bytes.

In this case in which the moving picture file that is now being recorded is divided at the time when the size of the moving picture file reaches the specified upper limit (2 GB), the size of the corresponding clip information file changes in accordance with the recording time of moving picture data.

For this reason, when the data rate (amount of data recorded per unit time) of moving picture data is high, the recording time corresponding to moving picture data having the upper limit size is short. Hence, the size of the clip information file becomes relatively small.

In contrast, when the data rate of moving picture data is extremely low, the recording time corresponding to moving picture data having the upper limit size is considerably long, and the size of a clip information file also becomes a considerably large size of, for example, several megabytes.

For this reason, there is a need to prepare a large-capacity memory as the management-information memory 106.

More specifically, when an image in which the differences between the frames are extremely small, such as a black image, is recorded for a long period, the data rate of moving picture data is extremely low.

In this embodiment, a memory having a relatively small capacity of 128 kilobytes (KB) is used as the management-information memory 106. At the time when the size of management information reaches the memory capacity of 128 KB before the size of a moving picture file reaches the upper limit size (2 GB) during recording, recording of the moving picture file is stopped, and a new file is created so as to continue recording.

FIG. 3 shows moving picture files and clip information files recorded on the recording medium R when the capacity of the management-information memory 106 is 128 KB. In FIG. 3, recording of a moving picture is stopped a time T2 after recording is started.

Referring to FIG. 3, the size of management information stored in the management-information memory 106 reaches 128 KB during recording of the first moving picture file 301. Then, the file-division control unit 107 detects that the size of management information stored in the management-information memory 106 has reached 128 KB, and instructs the recording unit 109 to divide the file. The file-division control unit 107 sets, as a threshold value, a capacity of a predetermined amount less than 128 KB, which is the capacity of the management-information memory 106, and determines whether or not the size of management information accumulated in the management-information memory 106 has exceeded the threshold value.

As a result, recording of the moving picture file 301 is stopped, and a new moving picture file 303 is created so as to continue recording. After recording of the moving picture file 301 is completed, a clip information file 302 related to the moving picture file 301 is recorded on the recording medium R. Since coding of moving picture data continues during recording of the clip information file 302, coded moving picture data are accumulated in the buffer memory 104. Further, the size of the moving picture file 301 is M1 bytes, which is less than the 2 GB upper limit size.

It is assumed that the size of the moving picture file 303 reaches 2 GB serving as the upper limit size during recording before the size of management information reaches 128 KB. At the time when the size of the moving picture file 303 reaches 2 GB, recording of the moving picture file 303 is stopped, and a new moving picture file 305 is created so as to continue recording. After recording of the moving picture file 303 is stopped, a clip information file 304 related to the moving picture file 303 is recorded on the recording medium R. In this case, the size of the clip information file 304 is M2 bytes (less than 128 KB) corresponding to the recording time of moving picture data stored in the moving picture file 303.

When instructions to stop recording are given during recording, recording of the moving picture file 305 is stopped, and a clip information file 306 related to the moving picture file 305 is recorded on the recording medium R. Since the instructions to stop recording are given before the size of the moving picture file 305 reaches the upper limit, the size of the moving picture file 305 is M3 bytes which is less than the upper limit size. The size of the clip information file 306 is M4 bytes (which is less than 128 KB) corresponding to the recording time of moving picture data stored in the moving picture file 305.

The file-division control unit 107 monitors the size of management information accumulated in the management-information memory 106 and the size of a moving picture file that is now being recorded by the recording unit 109 until instructions to stop recording are given after instructions to start recording are given from the operating unit 111.

Every time the size of management information reaches the capacity of the management-information memory 106 or the size of the moving picture file that is now being recorded reaches the upper limit size, the file-division control unit 107 instructs the recording unit 109 to divide the moving picture file, as described above.

In this embodiment, one clip information file is thus created and recorded for one moving picture file.

Operations of the embodiment will now be described with reference to the flowcharts shown in FIGS. 4 and 5.

In this embodiment, when power is turned on and instructions to start recording are given through the operating unit 111, the CPU 110 instructs the coding unit 103 to start coding, and also instructs the recording unit 109 to start recording. When instructions to stop recording are given from the operating unit 111, the CPU 110 instructs the coding unit 103 to stop coding, and also instructs the recording unit 109 to stop recording. Further, when the battery of the power supply 112 is removed or instructions to turn off the power are given from the operating unit 111 during recording, the CPU 110 instructs the coding unit 103 to stop coding, and also instructs the recording unit 109 to stop recording.

FIG. 4 is a flowchart illustrating an example of a procedure performed by the coding unit 103.

When instructions to start recording are given by user operation, the coding unit 103 starts coding (S401). Then, the coding unit 103 outputs coded moving picture data to the buffer memory 104 (S402). When coding of moving picture data for one GOP is completed, the coding unit 103 outputs stream information about the GOP to the management-information processing unit 105 (S403).

Subsequently, it is determined whether or not there is a request to finish recording (S404). When it is determined that there is no request for finishing, the above-described operations are performed again in S402 and S403. When it is determined in S404 that there is a request for finishing, coding is stopped (S405), and the procedure is finished.

Figure 5:
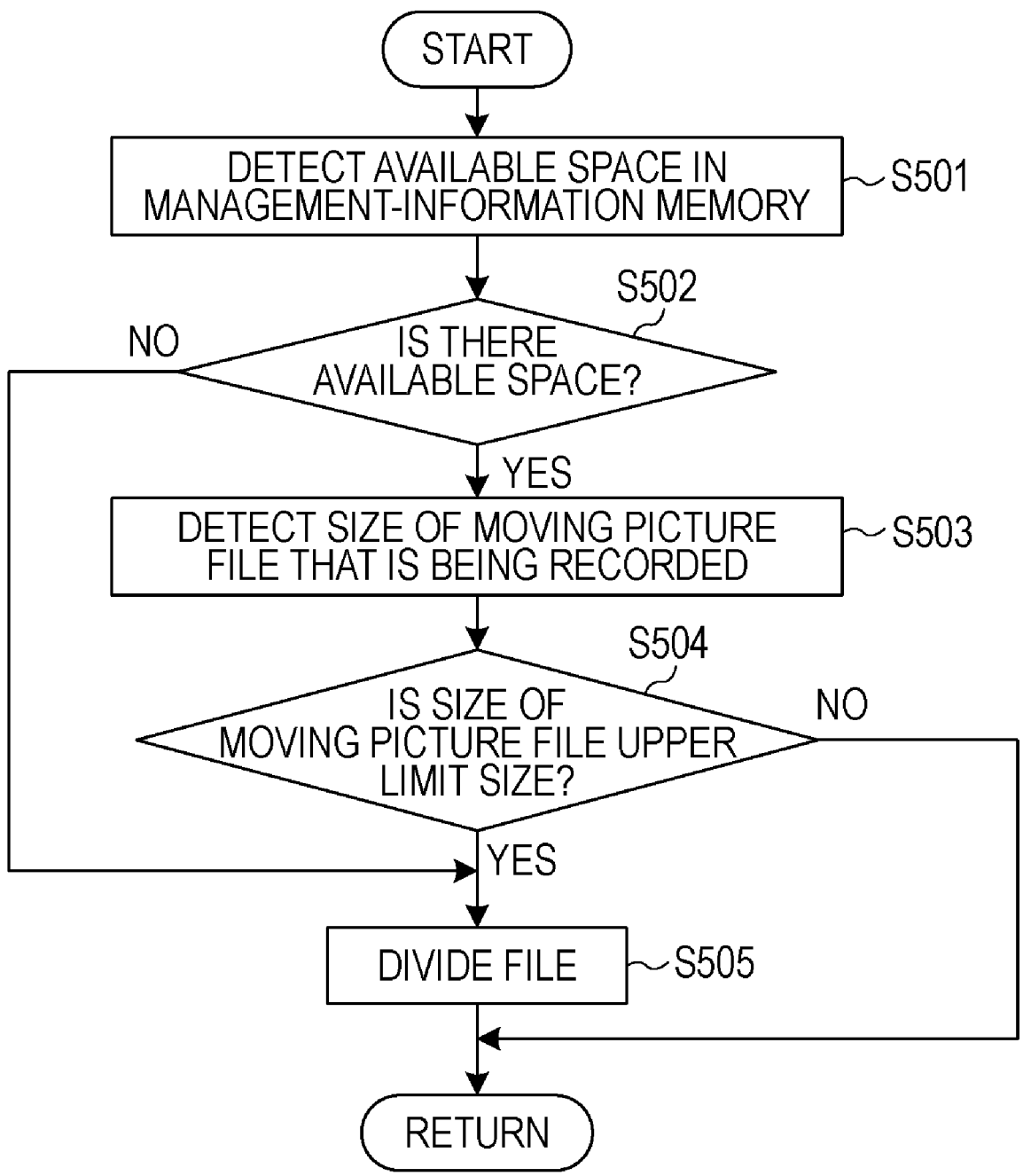
FIG. 5 is a flowchart showing a file-division determination procedure.

FIG. 5 is a flowchart showing a file-division determination procedure performed by the file-division control unit 107. The procedure shown in FIG. 5 is repeated at a predetermined timing from when instructions to start recording are given by the operating unit 111 to when instructions to stop recording are given.

First, an available space of the management-information memory 106 is detected, and the size of management information accumulated in the management-information memory 106 is detected (S501). Then, it is determined whether or not the available space of the management-information memory 106 is less than a threshold value (S502). When it is determined that the available space of the management-information memory 106 is not less than the threshold value, i.e., that there is not space available, a division flag is set in an internal register so as to give instructions to divide a moving picture file that is now being recorded (S505).

When it is determined in S502 that the available space of the management-information memory 106 does not reach the threshold value, i.e., that there is space available, the size of a moving picture file that is now being recorded is detected by the recording unit 109 (S503). Then, it is determined whether or not the size of the moving picture file is more than or equal to a predetermined value that is less a predetermined amount than the upper limit size (S504). When it is determined that the size of the moving picture file is less than the predetermined value, processing ends. When it is determined that the size of the moving picture file is more than or equal to the predetermined value, a division flag is set in the internal register so as to give instructions to divide the moving picture file (S505) and then processing ends.

Figure 6:
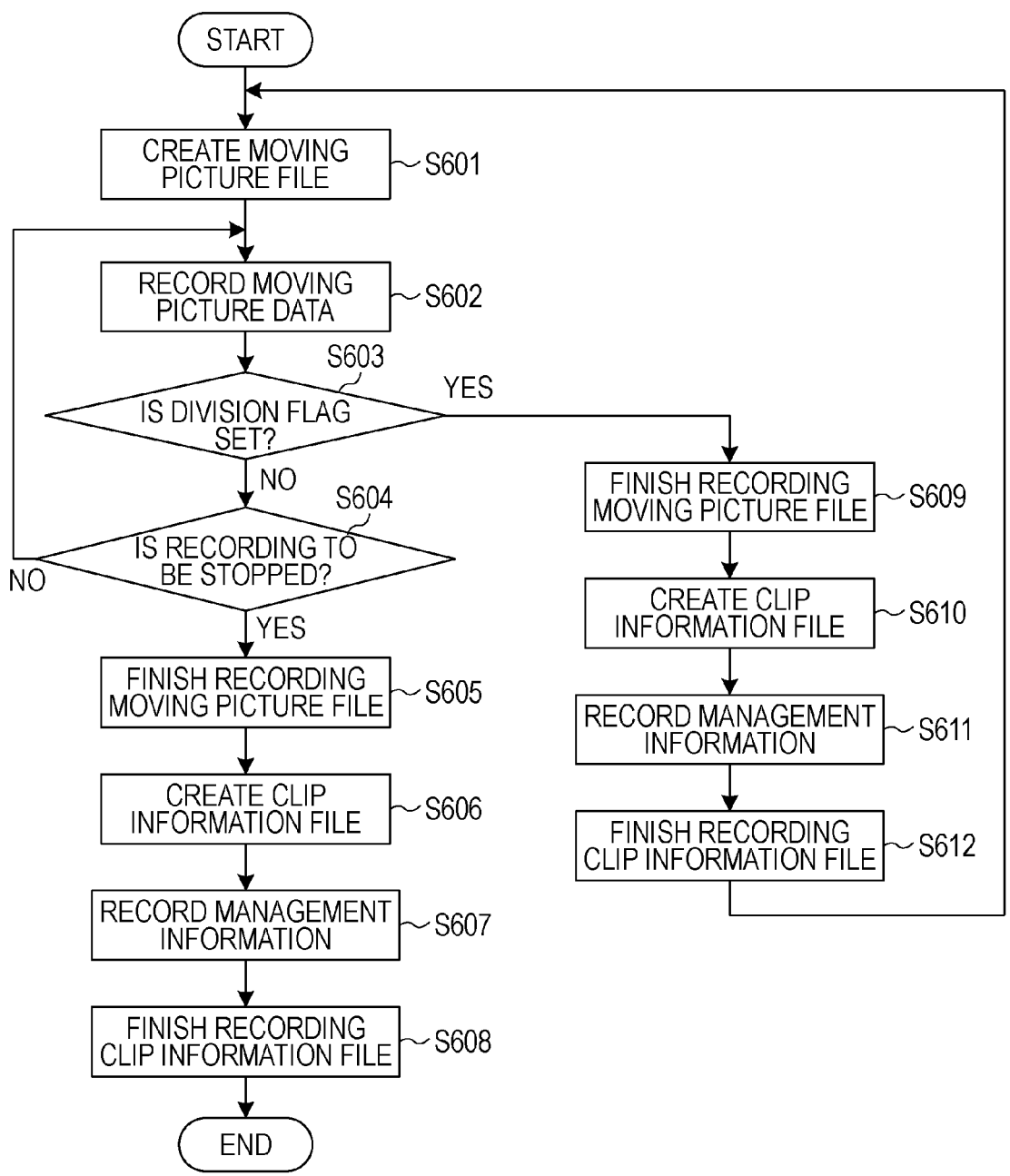
FIG. 6 is a flowchart showing file creation and recording control.

FIG. 6 is a flowchart showing a procedure for file creation and recording control performed by the file-division control unit 107. The procedure shown in FIG. 6 is carried out in parallel with the procedure shown in FIG. 5, and is repeated at a predetermined timing from when instructions to start recording are given by the operating unit 111 to when instructions to stop recording are given.

First, when instructions to start recording are given, a moving picture file is created on the recording medium R (S601). Then, moving picture data is read out from the buffer memory 104, and is recorded and stored in the moving picture file (S602).

Next, it is determined whether or not a division flag is set (S603). When the division flag is not set, it is determined whether or not instructions to stop recording are given (S604).

When instructions to stop recording are not given, the procedure returns to S602, and recording of moving picture data is continued.

When instructions to stop recording are given, necessary information, such as footer information (additional information) of the file, is recorded, and recording of the current moving picture file is finished (S605). Subsequently, a clip information file is created on the recording medium R (S606), and management information is read out from the management-information memory 106, and is recorded and stored in the clip information file (S607). Then, recording of the clip information file is finished (S608), and the recording operation is finished.

When it is determined in S603 that the division flag is set, necessary information, such as footer information (additional information) of the file, is recorded, and recording of the current moving picture file is finished (S609). Then, the division flag is reset, a clip information file is created on the recording medium R (S610), and management information is read out from the management-information memory 106 and is stored and recorded in the clip information file (S611). Thus, recording of the clip information file is finished (S612), a new moving picture file is created again on the recording medium R in S601, and recording of moving picture data is continued.

When the power supply 112 is removed, no power is supplied, and therefore, the procedure shown in FIG. 5 or FIG. 6 is stopped before completion.

In this case, a moving picture file that is being recorded and management information about the moving picture file are not recorded on the recording medium R.

According to this embodiment, a moving picture file that is now being recorded is divided every time the size of management information reaches a predetermined size in accordance with the capacity of the management-information memory or the size of the moving picture file that is now being recorded reaches the upper limit size, as described above.

Thus, a moving picture can be recorded for a long period without preparing a large-capacity memory as a memory for storing management information.

While the capacity of the management-information memory 106 is 128 KB in this embodiment, it can be other values.

In this case, when a general moving picture, which is not a special image such as a black image, is recorded, it is conceivable to set the size of management information corresponding to the time taken until the size of the moving picture file reaches 2 GB.

While the moving pictures file is recorded according to the FAT in this embodiment, other file systems can be used.

The units that constitute the above-described recording apparatus according to the embodiment of the present invention can be realized by executing a program stored in a RAM or a ROM of the computer. The present invention includes this program, and a computer-readable recording medium on which the program is recorded.

The present invention can be embodied by, for example, a system, an apparatus, a method, a program, or a storage medium. More specifically, the present invention is applicable to a system constituted by a plurality of devices, or to an apparatus including only one device.

The present invention is also applicable to a case in which programs of software for realizing the processes of the above-described recording method (programs corresponding to the flowcharts shown in FIGS. 4 to 6) are supplied to a system or an apparatus directly or remotely, and in which a computer in the system or the apparatus reads out and executes the supplied programs.

Hence, program code that is installed in the computer so as to realize the functions of the present invention by the computer also realize the present invention.

In this case, for example, object code, a program to be executed by an interpreter, and script data to be supplied to the OS can be used as long as they have functions of programs.

Various recording media can be used to supply programs. For example, the recording media include a floppy disk, a hard disk, an optical disk, a magneto-optical disk (MO), a CD-ROM, a CD-R, a CD-RW, a magnetic tape, a nonvolatile memory card, a ROM, and a DVD (DVD-ROM, DVD-R).

Alternatively, the program can be supplied by accessing an Internet website by using a browser of a client computer and downloading a computer program itself of the present invention or a compressed file containing an automatic installation function from the website into a recording medium such as a hard disk.

Program code that constitutes the program of the present invention can be divided into a plurality of files, and the files can be downloaded from different websites. In short, the present invention also includes a WWW server that allows a plurality of users to download the program files for realizing the functions of the present invention with the computer.

It is also possible to encrypt and store the program of the present invention on a storage medium such as a CD-ROM, to distribute the storage medium to users, to allow users, who meet certain requirements, and to download decryption key information from a website via the Internet. The encrypted program can be executed by using the key information, and can be installed in the computer.

While the above-described functions of the embodiment are realized by execution of the read program with the computer, they can also be realized when an OS running in the computer performs some or all of actual operations.

Further, the program read out from the recording medium can be written in a memory provided in a function expansion board incorporated in the computer or a function expansion unit connected to the computer. After that, a CPU or the like provided in the function expansion board or the function expansion unit can perform some or all of actual operations according to the program, thus realizing the above-described functions of the embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-330825 filed Dec. 21, 2007, which is hereby incorporated by reference herein in its entirety.

What is claimed is:

1. A recording apparatus comprising:
    an obtaining unit configured to obtain moving picture data;
    a memory;
    a management information processing unit configured to generate management information related to a position of a predetermined picture in the moving picture data obtained by the obtaining unit and to store the management information in the memory;
    a recording unit configured to record the management information read from the memory and a moving picture file including the moving picture data on a recording medium; and
    a control unit configured to control the recording unit so that, in response to a size of first management information which relates to a first moving picture file including first moving picture data and is generated by the management information processing unit reaching a predetermined size corresponding to a capacity of the memory during recording of the first moving picture file, the recording unit stops recording of the first moving picture file and starts to record a second moving picture file.

2. The recording apparatus according to claim 1, wherein the control unit controls the recording unit so that the recording unit records the first management information on the recording medium after recording of the first moving picture file is stopped in response to the size of the first management information generated by the management information processing unit reaching the predetermined size.

3. The recording apparatus according to claim 1,
    wherein the recording unit records the moving picture file and the management information on the recording medium according to a predetermined file system, and
    wherein the control unit controls the recording unit so that, in response to a size of the first moving picture file that is being recorded reaching an upper limit size specified by the file system, the recording unit stops recording of the first moving picture file and starts to record third moving picture file.

4. The recording apparatus according to claim 1, further comprising:
    an operating unit configured to input instructions to start and stop recording of the moving picture data,
    wherein the management information processing unit starts generation of the management information according to the instruction to start recording, and stops generation of the management information according to the instruction to stop recording, and
    wherein the control unit controls the recording unit so that the recording unit starts recording of the first moving picture file according to the instruction to start recording, and stops recording of the first moving picture file and starts to record the second moving picture file in response to the size of the first management information generated by the management information processing unit reaching the predetermined size after recording is started.

5. The recording apparatus according to claim 1,
    wherein the obtaining unit includes a coding unit configured to code the moving picture data in each group of pictures having a predetermined number of pictures, wherein the recording unit records the coded moving picture data, and wherein the management information processing unit generates the management information, the management information indicating a position of the group of pictures in the moving picture data.

6. The recording apparatus according to claim 1, wherein the management-information processing unit is configured to generate the management information related to the position of each of a plurality of the predetermined pictures in the moving picture data recorded by the recording unit.

7. A recording apparatus comprising:
an obtaining unit configured to obtain moving picture data comprising a plurality of predetermined units;
a management-information processing unit configured to generate management information related to a position of the plurality of predetermined units in the moving picture data obtained by the obtaining unit;
a recording unit configured to record the management information and a moving picture file including the moving picture data on a recording medium, a size of the management information increasing in accordance with a length of recording time of the moving picture data; and
a control unit configured to control the recording unit so that, in response to a size of first management information which relates to a first moving picture file including first moving picture data and is generated by the management information processing unit reaching a predetermined size during recording of the first moving picture file, the recording unit stops recording of the first moving picture file.

8. The apparatus according to claim 7, wherein the control unit controls the management information processing unit to generate second management information relating to the second moving picture file in response to the size of first management information reaching the predetermined size during recording of the first moving picture file.

9. The apparatus according to claim 7, wherein the management information includes information relating to position of each of the plurality of predetermined units from a head of the moving picture file.

10. The apparatus according to claim 7, wherein the recording unit encodes the input moving picture data in accordance with H.264 system and records the moving picture file including the encoded moving picture data on the recording medium, and wherein the predetermined unit corresponds to a group of pictures in the encoded moving picture data.

11. The apparatus according to claim 7, wherein the control unit controls the recording unit to stop recording the first moving picture file in response to the size of the first moving picture file reaching a predetermined value during recording of the first moving picture file before the size of the first management information reaches the predetermined size.

12. The apparatus according to claim 7, wherein the management-information processing unit starts creating the management information in accordance with a start of recording the moving picture data.

13. The apparatus according to claim 7, wherein the control unit controls the recording unit so that, in response to the size of the first management information reaching the predetermined size during recording of the first moving picture file, the recording unit stops recording the first moving picture file and starts to record a second moving picture file, and wherein the control unit controls the management information processing unit to generate second management information relating to the second moving picture file in response to the size of first management information reaching the predetermined size during recording of the first moving picture file.

14. A recording apparatus comprising:
an obtaining unit configured to obtain moving picture data;
an operating unit configured to give an instruction to start recording of the moving picture data;
a memory;
a management information processing unit configured to generate management information related to a position of a predetermined picture in the moving picture data obtained by the obtaining unit according to the instruction to start recording and to store the management information in the memory;
a recording unit configured to record the management information read from the memory and a moving picture file including the moving picture data on a recording medium; and
a control unit configured to control the recording unit so that, in response to a size of first management information which relates to a first moving picture file including first moving picture data and is generated by the management information processing unit reaching a predetermined size corresponding to a capacity of the memory after the instruction to start recording the first moving picture file is given, the recording unit stops recording of the first moving picture file starts to record a second moving picture file.

15. The apparatus according to claim 14, wherein the management information processing unit is configured to generate the management-information related to the position of each of a plurality of the predetermined pictures in the moving picture data recorded by the recording unit.

16. The apparatus according to claim 14, wherein the control unit controls the recording unit to stop recording the first moving picture file in response to the size of the first moving picture file reaching a predetermined value after the instruction to start recording the first moving picture file is given before the size of the first management information reaches the predetermined size.

17. The apparatus according to claim 14, wherein the control unit controls the recording unit so that, in response to the size of the first management information reaching the predetermined size after the instruction to start recording the first moving picture file is given, the recording unit stops recording the first moving picture file and starts to record a second moving picture file, and wherein the control unit controls the management information processing unit to generate second management information relating to the second moving picture file in response to the size of first management information reaching the predetermined size during recording of the first moving picture file after the instruction to start recording the first moving picture file is given.

18. A recording apparatus comprising:
an obtaining unit configured to obtain moving picture data;
a memory;
a management information processing unit configured to generate management information related to a position of a predetermined picture in the moving picture data obtained by the obtaining unit and to store the management information in the memory;
a recording unit configured to record the management information read from the memory and a moving picture file including the moving picture data on a recording medium in accordance with a predetermined file system; and a control unit configured to control the recording unit so that, in response to a size of first management information which relates to a first moving picture file including first moving picture data and is generated by the management information processing unit reaching a predetermined size corresponding to a capacity of the memory during recording of the first moving picture file, the recording unit stops recording of the first moving picture file and starts to record a second moving picture file, wherein the control unit is configured to control the recording unit so that, in response to a size of the first moving picture file that is being recorded reaching a predetermined value relating to an upper limit size specified by the file system, the recording unit stops recording of the first moving picture file and starts to record a third moving picture file.

19. A recording apparatus comprising:
an obtaining unit configured to obtain moving picture data;
a recording unit configured to record a moving picture file including the moving picture data obtained by the obtaining unit on a recording medium in accordance with a recording start instruction;
a generating unit configured to generate relating information relating to the moving picture data recorded by the recording unit in accordance with the recording start instruction, a size of the relating information increasing in accordance with a length of recording time of the moving picture data; and
a control unit configured to control the recording unit to stop recording a first moving picture file in response to a size of first relating information which relates to the first moving picture file including first moving picture data and is generated by the management information processing unit reaching a predetermined size.

20. The apparatus according to claim 19, wherein the relating information includes information related to a position of each of a plurality of predetermined pictures in the moving picture data from a head of the moving picture file.

21. The apparatus according to claim 19, wherein the moving picture data comprises a plurality of predetermined units, and wherein the relating information relates to position of each of the plurality of predetermined units from a head of the moving picture file.

22. The apparatus according to claim 19, wherein the recording unit encodes the moving picture data in accordance with H.264 system and records the moving picture file including the encoded moving picture data on the recording medium, and wherein the predetermined unit corresponds to a group of pictures in the encoded moving picture data.

23. The apparatus according to claim 19, wherein the control unit controls the recording unit to stop recording the first moving picture file in response to the size of the first moving picture file reaching a predetermined value before the size of the first relating information reaches the predetermined size.

24. The apparatus according to claim 19, wherein the control unit controls the recording unit so that, in response to the size of the first relating information reaching the predetermined size, the recording unit stops recording the first moving picture file and starts to record a second moving picture file, and
wherein the control unit controls the management information processing unit to generate second relating information relating to the second moving picture file in response to the size of first management information reaching the predetermined size.

25. A recording method comprising:
obtaining moving picture data comprising a plurality of predetermined units;
generating management information related to a position of the plurality of predetermined units in the obtained moving picture data;
recording the generated management information and a moving picture file including the obtained moving picture data on a recording medium, a size of the management information increasing in accordance with a length of recording time of the moving picture data; and
controlling the step of recording to stop recording of first moving picture file in response to a size of first management information which relates to the first moving picture file including first moving picture data and is generated by the step of generating reaching a predetermined size during recording of the first moving picture file.

26. The method according to claim 25, wherein the management information includes information relating to position of each of the plurality of predetermined units from a head of the moving picture file.

27. The method according to claim 25, wherein the step of recording encodes the input moving picture data in accordance with H.264 system and records the moving picture file including the encoded moving picture data on the recording medium, and wherein the predetermined unit corresponds to a group of pictures in the encoded moving picture data.

28. The method according to claim 25, wherein the step of controlling controls the step of recording to stop recording the first moving picture file in response to the size of the first moving picture file reaching a predetermined value during recording of the first moving picture file before the size of the first management information reaches the predetermined size.

29. The method according to claim 25, wherein the step of generating starts to generate the management information in accordance with a start of recording the moving picture data.

30. The method according to claim 25, wherein the step of controlling controls the step of recording so that, in response to the size of the first management information reaching the predetermined size during recording of the first moving picture file, the step of recording stops recording the first moving picture file and starts to record a second moving picture file.

31. A recording method comprising:
obtaining moving picture data;
recording a moving picture file including the obtained moving picture data on a recording medium in accordance with a recording start instruction;
generating relating information relating to the moving picture data recorded on the recording medium in accordance with the recording start instruction, a size of the relating information increasing in accordance with a length of recording time of the moving picture data; and
controlling the step of recording to stop recording of a first moving picture file in response to a size of a first relating information which relates to the first moving picture file including first moving picture data and is generated by the step of generating reaching a predetermined size.

32. The method according to claim 31, wherein the relating information includes information related to a position of each of a plurality of predetermined pictures in the moving picture data from a head of the moving picture file.

33. The method according to claim 31, wherein the moving picture data comprises a plurality of predetermined units, and wherein the relating information relates to position of each of the plurality of predetermined units from a head of the moving picture file.

34. The method according to claim 33, wherein the step of recording encodes the moving picture data in accordance with H.264 system and records the moving picture file including the encoded moving picture data on the recording medium, and wherein the predetermined unit corresponds to a group of pictures in the encoded moving picture data.

35. The method according to claim 31, wherein the step of controlling controls the step of recording to stop recording the first moving picture file in response to the size of the first moving picture file reaching a predetermined value before the size of the first relating information reaches the predetermined size.

36. The method according to claim 31, wherein the step of controlling controls the step of recording so that, in response to the size of the first relating information reaching the predetermined size during recording of the first moving picture file, the step of recording stops recording the first moving picture file and records a second moving picture file.

* * * * *